US009822577B2

(12) United States Patent
Fujimoto et al.

(10) Patent No.: US 9,822,577 B2
(45) Date of Patent: Nov. 21, 2017

(54) MANIPULATION ASSISTING CONTROL APPARATUS

(71) Applicants: Keigo Fujimoto, Aichi (JP); Yusuke Ueda, Aichi (JP); Kazutaka Kubota, Aichi (JP); Hisayoshi Kuroshima, Aichi (JP)

(72) Inventors: Keigo Fujimoto, Aichi (JP); Yusuke Ueda, Aichi (JP); Kazutaka Kubota, Aichi (JP); Hisayoshi Kuroshima, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/205,657

(22) Filed: Jul. 8, 2016

(65) Prior Publication Data

US 2017/0009510 A1    Jan. 12, 2017

(30) Foreign Application Priority Data

Jul. 8, 2015  (JP) ................................. 2015-137137

(51) Int. Cl.
*H02K 7/00* (2006.01)
*E05F 15/75* (2015.01)
(Continued)

(52) U.S. Cl.
CPC ................. *E05F 15/75* (2015.01); *B60J 5/10* (2013.01); *E05F 15/73* (2015.01);
(Continued)

(58) Field of Classification Search
CPC ...... E05F 15/75; E05F 15/73; E05Y 2900/50; E05Y 2800/113; B60J 5/10; H02P 1/16; H02P 3/06
See application file for complete search history.

(56) References Cited

U.S. PATENT DOCUMENTS 6,398,288 B1 *  6/2002  Yuge ..................... E05F 15/627
                                                            296/146.4
7,063,373 B2 *  6/2006  Chikata ................... E05F 15/63
                                                            192/56.42
(Continued)

FOREIGN PATENT DOCUMENTS

JP    2001-246936 A    9/2001
JP    2006-299603 A    11/2006
(Continued)

*Primary Examiner* — Rita Leykin
(74) *Attorney, Agent, or Firm* — Osha Liang LLP

(57) ABSTRACT

In a manipulation assisting control apparatus, a manipulation assistance controller causes a switch unit to be in an on-state and which executes control of a motor drive circuit to apply an assisting force, in a case where a manipulation target object is moved in a predetermined direction. A first stop controller causes the switch unit to be in an off-state and stops the control of the motor drive circuit, in a case where the manipulation target object moved in the predetermined direction stops at an end position. A second stop controller causes the switch unit to be in the on-state and stops the control of the motor drive circuit, in a case where the manipulation target object moved in the predetermined direction stops at an intermediate position or in a case where the manipulation target object moves in a direction opposite to the predetermined direction.

8 Claims, 7 Drawing Sheets

(51) Int. Cl.
  *B60J 5/10* (2006.01)
  *E05F 15/73* (2015.01)
  *H02P 1/16* (2006.01)
  *H02P 3/06* (2006.01)

(52) U.S. Cl.
  CPC ..... *E05Y 2800/113* (2013.01); *E05Y 2900/50* (2013.01); *H02P 1/16* (2013.01); *H02P 3/06* (2013.01)

(56) References Cited

U.S. PATENT DOCUMENTS

| | | | |
|---|---|---|---|
| 7,071,644 B2 * | 7/2006 | Kawanobe | E05F 15/40 318/280 |
| 7,288,907 B2 * | 10/2007 | Kamiya | B60J 5/06 296/146.2 |
| 7,472,944 B2 * | 1/2009 | Miyagawa | B60J 5/06 296/155 |
| 8,508,159 B2 * | 8/2013 | Herrmann | E05F 15/611 296/1.01 |
| 8,944,487 B2 * | 2/2015 | Yuge | E05F 15/63 16/79 |
| 9,231,453 B2 * | 1/2016 | Abe | H02K 11/0063 |
| 9,340,215 B2 * | 5/2016 | Masuda | B61D 19/007 |
| 9,397,604 B2 * | 7/2016 | Oakley | H02P 29/0055 |
| 9,564,850 B2 * | 2/2017 | Fujimoto | H02P 31/00 |
| 9,677,315 B2 * | 6/2017 | Fujimoto | E05F 15/60 |
| 2015/0054294 A1 * | 2/2015 | Uno | E05B 81/06 292/194 |

FOREIGN PATENT DOCUMENTS

| | | |
|---|---|---|
| JP | 2008-221862 A | 9/2008 |
| JP | 2011-236697 A | 11/2011 |

* cited by examiner

MANIPULATION ASSISTING CONTROL APPARATUS

CROSS-REFERENCES TO RELATED APPLICATIONS

This application is based upon and claims the benefit of priority from Japanese Patent Application No. 2015-137137, filed on Jul. 8, 2015; the entire contents of which are incorporated herein by reference.

FIELD

One or more embodiments of the present invention relate to a manipulation assisting control apparatus which applies an assisting force so as to make it possible for a person to manipulate a manipulation target object with a small amount of force.

BACKGROUND

A back door, a slide door, or the like mounted on a vehicle can be opened and closed by manual manipulation. Meanwhile, there is a manipulation assisting control apparatus which applies an assisting force by a motor to make it possible to manipulate a manipulation target object with a small force in a case where the manipulation target object is opened and closed by manual manipulation.

For example, a manipulation assisting control apparatus disclosed in JP-A-2011-236697 or JP-A-2001-246936 detects an opening or closing position, a movement state, or an opening and closing manipulation force of a slide door of a vehicle by a sensor. When the sensor detects that the slide door is opened or closed on the basis of an output value of the sensor, a motor drive circuit is controlled to drive a motor and apply an assisting force for the opening and closing manipulation.

In JP-A-2001-246936, the motor drive circuit is constituted with an H-bridge circuit including four switching elements, and is connected to the motor. A relay is provided on a current path from a power supply to the motor drive circuit. When the sensor detects the opening and closing manipulation of a slide door, the relay is turned on, the current path is connected, and the current is supplied from a battery to the motor drive circuit. The motor drive circuit is controlled to cause the current to flow into the motor to drive the motor and apply an assisting force for the opening and closing manipulation of the slide door. Further, when the opening and closing manipulation of the slide door is ended or the like, the relay is turned off, the current path is disconnected, and the control of the motor drive circuit is stopped. With this, the current does not flow from the battery to the motor drive circuit or the motor, the motor is stopped, and application of the assisting force is also stopped.

However, there is a problem that when the relay is turned on or off, harsh sound is generated due to operation of an electromagnet to give a person a feeling of discomfort. As a countermeasure against the problem, for example, in an electric power steering apparatus of JP-A-2008-221862, a relay disposed between a power supply and a motor drive circuit and a motor relay disposed between the motor drive circuit and a motor are turned off in accordance with the timing of the sound occurrence accompanied by the opening and closing of a door of a vehicle after an assist control for a handle manipulation is ended. With this, the sound occurring when the relay is turned off is completely removed by the sound of opening and closing of the door and thus, it is possible to reduce the harsh sound which is given to a driver.

JP-A-2006-299603 discloses an opening and closing drive apparatus for automatically opening and closing a back door of a vehicle in accordance with switch manipulation.

In the related art, the manipulation assisting control apparatus turns a switch unit (relay or the like) provided in a current path off and interrupts flow of the current from the power supply to the motor when a manipulation target object is not manipulated in consideration of safety for preventing malfunctioning of a manipulation target object or the like and reduction of power consumption or the like.

However, if the switch unit is turned on and off each time when the manipulation of the manipulation target object is started and ended, in a case where a relay is used as the switch unit, harsh sound is generated and a feeling of discomfort is given to a manipulator. Furthermore, since the switch unit is changed from an off-state to an on-state at the time when the manipulation of the manipulation target object is started, if the motor drive circuit is controlled, driving of the motor is delayed. Since motor current flows to a motor terminal in a direction which is opposite to a desired direction by a counter electromotive force generated by rotation of a motor until the motor is driven, a manipulation load for the manipulation target object becomes heavier. When the motor is driven, an assisting force is applied for the manipulation of the manipulation target object and thus, the manipulation load for the manipulation target object becomes lighter. As described above, if the manipulation load first becomes heavier and then becomes lighter at the time when the manipulation of the manipulation target object is started, a sense of incompatibility is given to a manipulator.

SUMMARY

One or more embodiments of the present invention reduce the number of times of on and off manipulation of a switch unit in a manipulation assisting control apparatus.

In accordance with one or more embodiments of the present invention, a manipulation assisting control apparatus includes a motor drive circuit which drives a motor, a switch unit provided in a current path through which electric current is supplied from a power supply to the motor through the motor drive circuit, a position detection unit which detects a position of a manipulation target object, a movement detection unit which detects a movement of the manipulation target object, and a manipulation assistance controller which controls the motor drive circuit such that an assisting force is applied by the motor for manipulation of the manipulation target object. The manipulation assistance controller causes the switch unit to be in an on-state and executes control of the motor drive circuit such that the assisting force is applied by the motor in a case where the manipulation target object is moved in a predetermined direction. The manipulation assisting control apparatus further includes a first stop controller which causes the switch unit to be in an off-state and which stops the control of the motor drive circuit in a case where the manipulation target object which is moved in the predetermined direction stops at an end position, and a second stop controller which causes the switch unit to be in the on-state and which stops the control of the motor drive circuit in a case where the manipulation target object which is moved in the predetermined direction stops at an intermediate position or in a case where the manipulation target object moves in a direction opposite to the predetermined direction.

With the above configuration, in a case where the manipulation target object is manipulated to be moved from a start position in the predetermined direction, the switch unit is caused to be in the on-state and the control of the motor drive circuit is executed such that the assisting force is applied by the motor. Thereafter, in a case where the manipulation target object stops at the end position, the switch unit is caused to be in the off-state, the control of the motor drive circuit is stopped, and manipulation assistance is ended. However, in a case where the manipulation target object stops at the intermediate position or in a case where the manipulation target object is manipulated to be moved in a direction opposite to the predetermined direction, the control of the motor drive circuit is stopped while maintaining the switch unit in the on-state and the manipulation assistance is ended. In a case where the manipulation target object is manipulated again to be moved from the intermediate position in a target direction, the control of the motor drive circuit is executed while maintaining the switch unit in the on-state. In this manner, the number of times of on and off manipulation of the switch unit may be reduced in the manipulation assisting control apparatus.

In one or more embodiments of the present invention, in the manipulation assisting control apparatus, when the manipulation assistance controller executes the control of the motor drive circuit, the current flows in the motor and the assisting force is generated by the motor. When first stop controller or the second stop controller stops the control of the motor drive circuit, the current does not flow in the motor and the motor is stopped.

In one or more embodiments of the present invention, in the manipulation assisting control apparatus, the switch unit may include a first switch unit provided in a first current path from the power supply to the motor drive circuit and a second switch unit provided in a second current path from the motor drive circuit to the motor.

In one or more embodiments of the present invention, in the manipulation assisting control apparatus, the first stop controller may cause the switch unit to be in the off-state and stops the control of the motor drive circuit even in a case where the on-state of the switch unit continues for a first predetermined time.

In one or more embodiments of the present invention, in the manipulation assisting control apparatus, even in a case where the manipulation target object which is moved in the predetermined direction stops at the intermediate position or in a case where the manipulation target object is moved in a direction opposite to the predetermined direction, when the on-state of the switch unit continues for a second predetermined time, the first stop controller may cause the switch unit to be in the off-state and stop the control of the motor drive circuit.

In one or more embodiments of the present invention, in the manipulation assisting control apparatus, a relay or a semiconductor switching element may be used as the switch unit.

In one or more embodiments of the present invention, the manipulation target object may be a back door of a vehicle, and the manipulation assisting control apparatus may be a power back door control apparatus which applies the assisting force by the motor for an opening and closing manipulation of the back door by manual manipulation.

According to one or more embodiments of the present invention, in the manipulation assisting control apparatus, it is possible to reduce the number of times of on and off manipulation of the switch unit.

DETAILED DESCRIPTION

Figure 1:
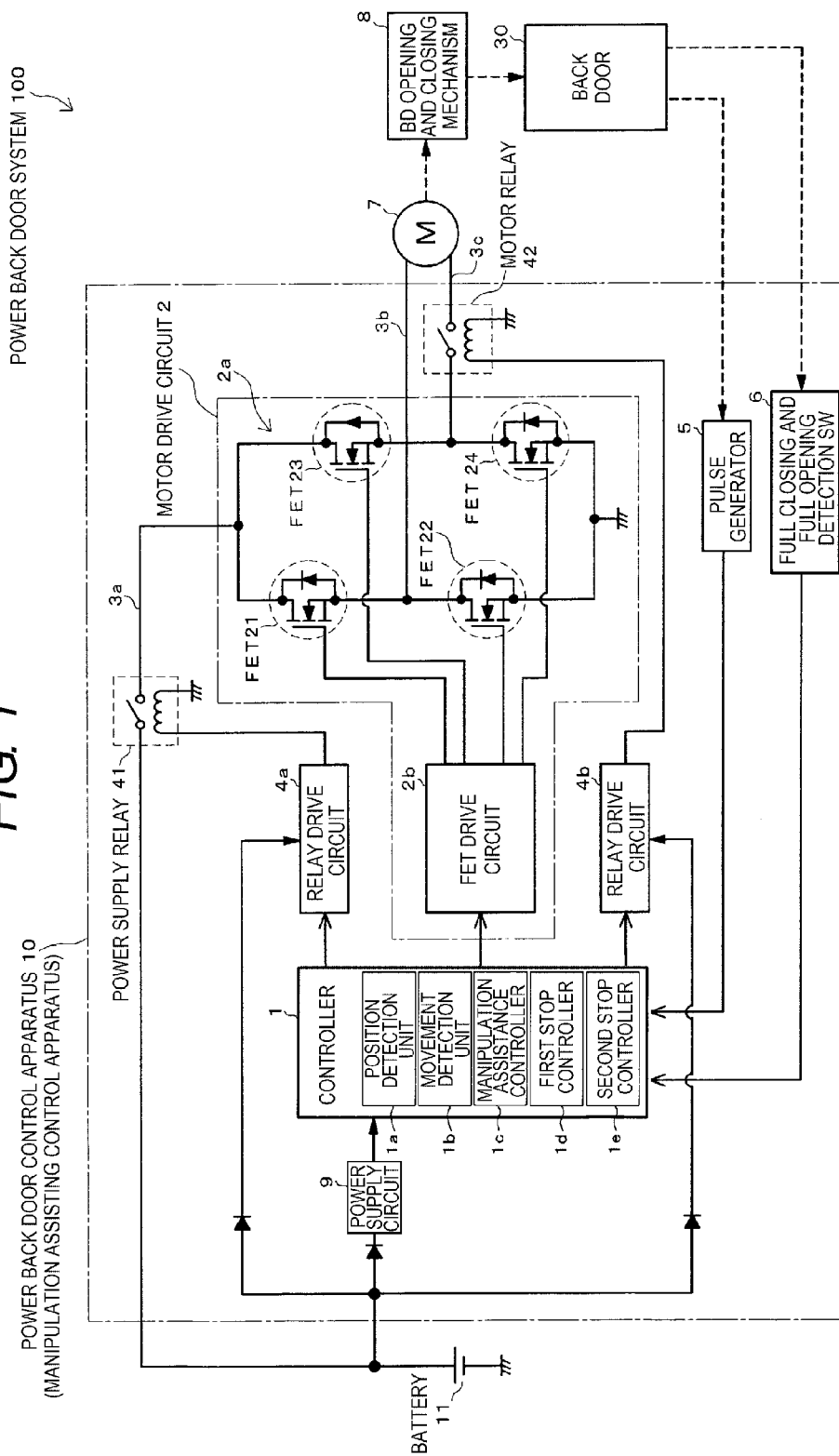
FIG. 1 is a block diagram illustrating a configuration of a power back door control apparatus according to an embodiment of the present invention.

Hereinafter, embodiments of the present invention will be described with reference to the drawings. In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention. In the figures, the same parts or corresponding parts will be given the same reference numerals.

First, a configuration of the present embodiment will be described with reference to FIG. 1 and FIG. 2.

FIG. 1 is a block diagram illustrating a configuration of a power back door control apparatus 10. FIG. 2 is a diagram illustrating an example of a back door 30.

In FIG. 1, a power back door system 100 incorporates the power back door control apparatus 10, a battery 11, a motor 7, a back door (BD) opening and closing mechanism 8, and the back door 30. The power back door system 100 is mounted on an automatic four wheel vehicle.

Figure 2:
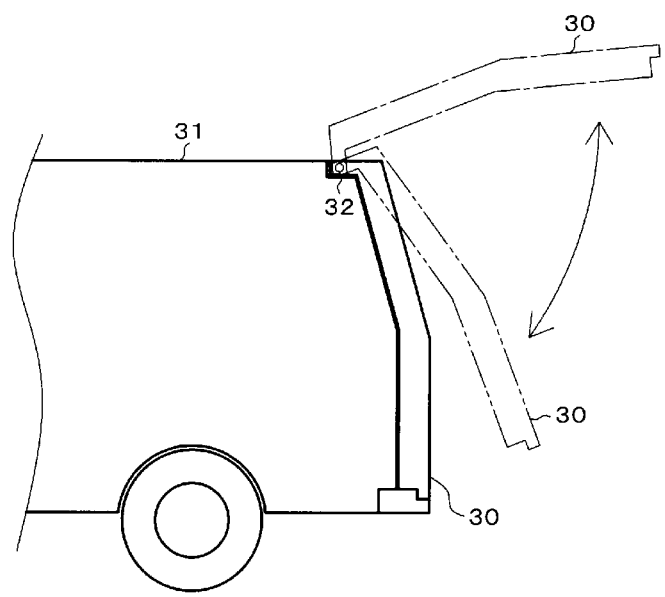
FIG. 2 is a diagram illustrating an example of a back door.

The power back door control apparatus 10 is provided in a vehicle body 31 of FIG. 2. The BD opening and closing mechanism 8 for opening and closing the back door 30 is provided in the vehicle body 31 or the back door 30. The motor 7 is a power source of the BD opening and closing mechanism 8 and is provided in the vehicle body 31.

As illustrated in FIG. 2, the back door 30 is made up of a swing-up type of back door which is provided in a rear surface of the vehicle body 31 of the automatic four wheel vehicle. The back door 30 is opened by swinging a lower end of the back door upward and on the contrary, the back door 30 is closed by swinging the lower end of the back door downward, centering on a rotating shaft 32 provided at an upper end of the back door. In FIG. 2, the back door 30 located at a fully closed position is represented by a solid line, the back door 30 located at a fully open position is represented by a single-dot chain line, and the back door 30 located at an intermediate position between the fully open position and the fully closed position is represented by a two-dot chain line. The back door 30 is locked by a lock mechanism which is not illustrated so that opening operation is not allowed in the fully closed position. When locking by the lock mechanism is released, the opening operation of the back door 30 becomes possible.

The back door 30 can be opened and closed by manual manipulation by grasping the lower end or a gripper (not illustrated). A time required for opening manipulation of the back door 30 from the fully closed position to the fully open position or a time required for closing manipulation of the back door 30 from the fully open position to the fully closed position is normally less than ten seconds.

In a case where the back door 30 is opened and closed by manual manipulation, the power back door control apparatus 10 applies an assisting force by the motor 7 to thereby enable an manipulator to perform the opening and closing manipulation on the back door 30 with a small force (power assist operation).

The power back door control apparatus 10 can also drive the motor 7, operate the BD opening and closing mechanism 8, and automatically open and close the back door 30 in accordance with manipulation of a switch, which is not illustrated (automatic opening and closing operation).

The power back door control apparatus 10 is an example of a "manipulation assisting control apparatus" according to one or more embodiments of the present invention. The back door 30 is an example of a "manipulation target object" according to one or more embodiments of the present invention.

The power back door control apparatus 10 is equipped with a controller 1, a motor drive circuit 2, current paths 3a, 3b, and 3c, relays 41 and 42, relay drive circuits 4a and 4b, a pulse generator 5, a full closing and full opening detection SW (switch) 6, and a power supply circuit 9.

The controller 1 is made up of a microcomputer. The controller 1 is provided with a position detection unit 1a, a movement detection unit 1b, a manipulation assistance controller 1c, a first stop controller 1d, and a second stop controller 1e. The respective units 1a to 1e are configured by software, for example. As another example, respective units 1a to 1e may be configured by hardware.

The position detection unit 1a is an example of a "position detection unit" according to one or more embodiments of the present invention. The movement detection unit 1b is an example of a "movement detection unit" according to one or more embodiments of the present invention. The manipulation assistance controller 1c is an example of a "manipulation assistance controller" according to one or more embodiments of the present invention. The first stop controller 1d is an example of a "first stop controller" according to one or more embodiments of the present invention. The second stop controller 1e is an example of a "second stop controller" according to one or more embodiments of the present invention.

The power supply circuit 9 generates power used for driving the controller 1 from power of the battery 11 and supplies the power to the controller 1. The battery 11 is an example of a "power supply" according to one or more embodiments of the present invention.

The motor drive circuit 2 is constituted with an H-bridge circuit 2a and an FET drive circuit 2b. The H-bridge circuit 2a includes four field effect transistors (FETs) 21 to 24 and is connected with the motor 7. The FET drive circuit 2b controls on and off operations of each of the FETs 21 to 24 by pulse width modulation (PWM).

The power supply relay 41 is provided in a first current path 3a from the battery 11 to the H-bridge circuit 2a of the motor drive circuit 2. The motor relay 42 is provided in one current path 3c of second current paths 3b and 3c from the H-bridge circuit 2a to the motor 7.

Each of the relays 41 and 42 is made up of an electromagnetic relay. The relay drive circuit 4a turns the power supply relay 41 on and off. The relay drive circuit 4b turns the motor relay 42 on and off. The relays 41 and 42 are turned on by the relay drive circuits 4a and 4b and thus, the current paths 3a and 3c enter a conductible state, respectively. The relays 41 and 42 are turned off by the relay drive circuits 4a and 4b and thus, the current paths 3a and 3c enter an interrupted state, respectively.

The relays 41 and 42 are turned on by the relay drive circuits 4a and 4b, and the FET 21 and the FET 24 are turned on and off while synchronizing the FET 21 with the FET 24 using the PWM in a state where the FET 22 and the FET 23 are turned off by the FET drive circuit 2b and thus, the current supplied from the battery 11 flows in the motor 7 in a normal direction and the motor 7 rotates normally. The relays 41 and 42 are turned on by the relay drive circuits 4a and 4b, and the FET 22 and the FET 23 are turned on and off while synchronizing the FET 22 with the FET 23 using the PWM in a state where the FET 21 and the FET 24 are turned off by the FET drive circuit 2b and thus, the current supplied from the battery 11 flows in the motor 7 in a reverse direction and the motor 7 rotates reversely.

By continuing to turn at least one of the relays 41 and 42 off or to turn all the FETs 21 to 24 off, the current does not flow from the battery 11 to the motor 7 and the motor 7 is stopped. Furthermore, even when one of the sets of FETs (FET 21 and FET 24, FET 22 and FET 23), each of which forms a pair, that allow the motor current to flow is not turned on, the current does not flow from the battery 11 to the motor 7 and the motor 7 is stopped.

The power supply relay 41 and the motor relay 42 are an example of "switch means" according to one or more embodiments of the present invention. The power supply relay 41 is an example of a "first switch means" according to one or more embodiments of the present invention. The motor relay 42 is an example of a "second switch means" according to one or more embodiments of the present invention.

The pulse generator 5 is made up of a two-phase rotary encoder and is provided in the motor 7 or the BD opening and closing mechanism 8. The pulse generator 5 outputs two pulse signals of which phases are shifted from each other to the controller 1 in accordance with a rotation state of the motor 7 or an activation state of the BD opening and closing mechanism 8.

The rotation state of the motor 7, the activation state of the BD opening and closing mechanism 8, and an open or closed state of the back door 30 are in association with each other. In this manner, the position detection unit 1a of the controller 1 detects two pulse signals output from the pulse generator 5 to detect an opening or closing position of the back door 30 on the basis of the pulse signals.

The movement detection unit 1b detects the movement of the back door 30 in the opening direction and the movement of the back door 30 in the closing direction on the basis of temporal change in a door position detected by the position detection unit 1a.

The full closing and full opening detection SW (switch) 6 is provided in a rear part of the vehicle body 31. The full closing and full opening detection SW 6 detects that the back door 30 is fully closed or fully open and outputs a detection signal to the controller 1. The position detection unit 1a detects that the back door 30 is located at the fully closed position or the fully open position on the basis of the output signal from the full closing and full opening detection SW 6.

In a case where the back door 30 is subjected to the opening manipulation from the fully closed position to the fully open position, the fully closed position is a start position of the opening manipulation and the fully open position is an end position of the opening manipulation. In contrast, in a case where the back door 30 is subjected to the closing manipulation from the fully open position to the fully closed position, the fully open position is a start position of the closing manipulation and the fully closed position is an end position of the closing manipulation. An intermediate position of the opening and closing manipulation of the back door 30 is located between the fully closed position and the fully open position.

The controller 1 determines a state of the opening or closing manipulation of the back door 30 on the basis of the detection results of the position detection unit 1a and the movement detection unit 1b. Specifically, if the movement of the back door 30 is detected by the movement detection unit 1b when the back door 30 is not automatically opened and closed, the controller 1 determines that the back door 30 is opened and closed by manual manipulation. Furthermore, the controller 1 determines whether the manipulation direction of the back door 30 is the opening direction or the closing direction on the basis of the change in the position of the back door 30 detected by the position detection unit 1a.

In a case where the controller 1 detects that the opening manipulation of the back door 30 is performed, the manipulation assistance controller 1c turns the relays 41 and 42 on through the relay drive circuits 4a and 4b and executes assist control of the motor drive circuit 2.

The assist control of the motor drive circuit 2 is to control the motor drive circuit 2 so that an assisting force is applied by the motor 7 for the opening manipulation of the back door 30. Specifically, a duty ratio of the PWM signal to a set of FETs (for example, FET 21 and FET 24) that form a pair in the H-bridge circuit 2a is set on the basis of the movement amount or the movement speed in the opening direction of the back door 30 and the two FETs are turned on and off while synchronizing the two FETs with each other at the set duty ratio, thereby causing currents to flow to the motor 7 in an opening activation direction. With this, the motor 7 rotates in the opening activation direction to cause the BD opening and closing mechanism 8 to perform the opening activation and thus, the opening manipulation of the back door 30 is assisted, in accordance with the opening manipulation state of the back door 30 (manipulation assistance). As described above, the reason why the opening manipulation of the back door 30 is assisted is that the load applied to the hands is large in a case where the back door 30 is gripped and lifted by hand against gravity.

On the one hand, in a case where the controller 1 detects that the closing manipulation of the back door 30 is made, the manipulation assistance controller 1c does not turn the relays 41 and 42 on and does not execute the assist control of the motor drive circuit 2. That is, the closing manipulation of the back door 30 is not assisted by the power of the motor 7. As described above, the reason why the closing manipulation of the back door 30 is not assisted is that gravity is applied to the back door 30 and thus the load applied to the hands is small in a case where the back door 30 is pulled down by hand.

When a first predetermined stop condition is established after assistance for the opening manipulation of the back door 30 is started, the first stop controller 1d turns the relays 41 and 42 on and stops the assist control of the motor drive circuit 2. Specifically, all the FETs 21 to 24 of the motor drive circuit 2 are turned off or one of the sets of FETs, each of which forms a pair, is turned off, and the current to the motor 7 is interrupted. With this, rotation of the motor 7 in the opening activation direction is stopped and assistance for the opening manipulation of the back door 30 is ended.

When a second predetermined stop condition is established after the assistance for the opening manipulation of the back door 30 is started, the second stop controller 1e stops the assist control of the motor drive circuit 2 while turning the relays 41 and 42 on. Also, in this case, all the FETs 21 to 24 of the motor drive circuit 2 are turned off or one of the sets of FETs, each of which forms a pair, is turned off, and the current to the motor 7 is interrupted. With this, the rotation of the motor 7 in the opening activation direction is stopped and the assistance for the opening manipulation of the back door 30 is ended.

Next, details of the power assist operation of the power back door control apparatus 10 will be described with reference to FIG. 3 to FIG. 5.

Figure 3:
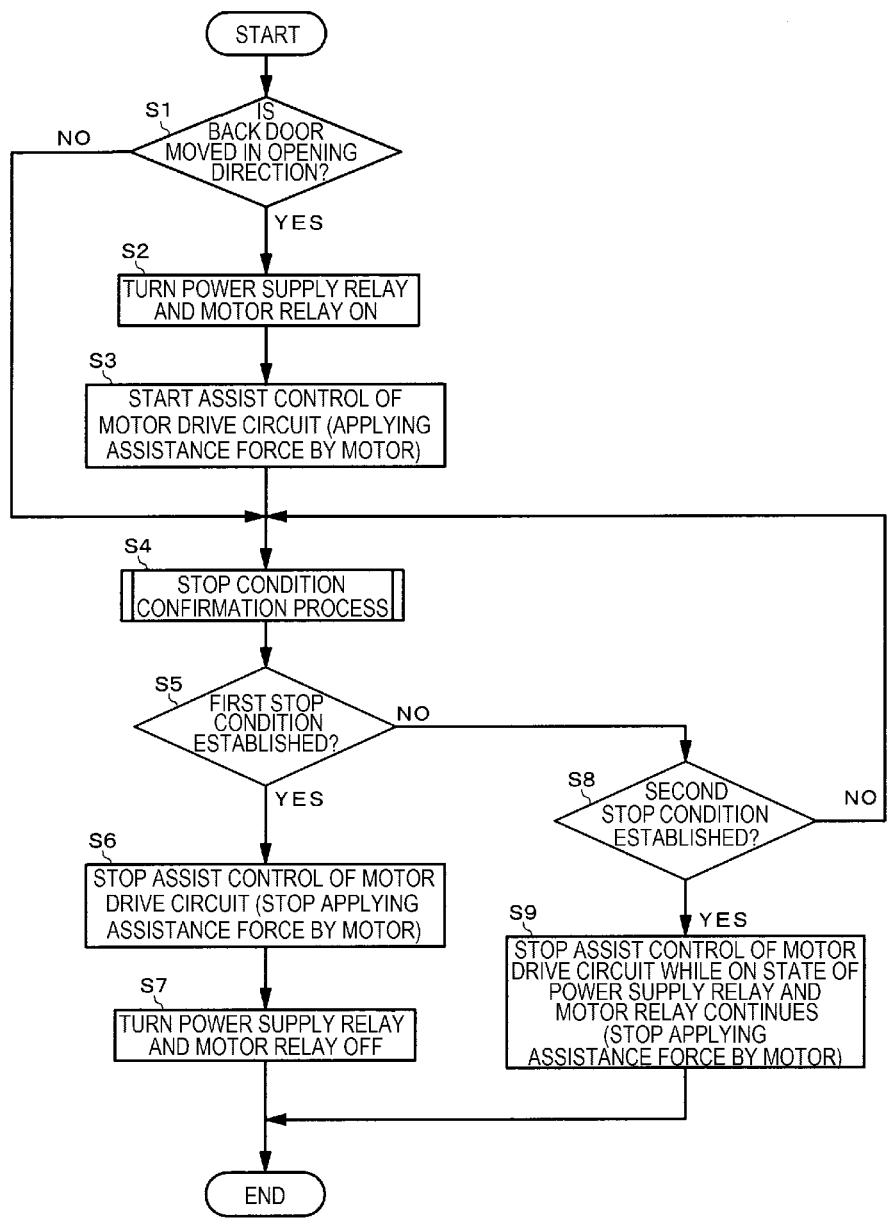
FIG. 3 is a flow chart illustrating a power assist operation of the power back door control apparatus of FIG. 1.

FIG. 3 is a flow chart illustrating a power assist operation of the power back door control apparatus 10. FIG. 5 is a time chart illustrating an example of the operation of the power back door control apparatus 10.

Figure 5:
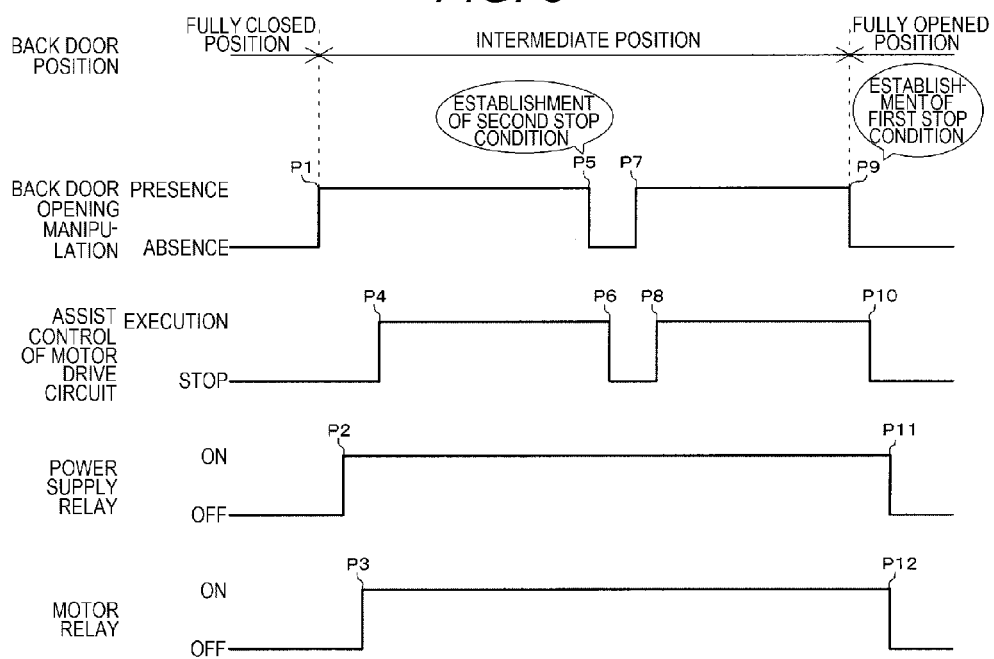
FIG. 5 is a time chart illustrating an example of operation of the power back door control apparatus of FIG. 1.

For example, when the back door 30 is stopped at the fully closed position or the fully open position, as illustrated in the left of P1 of FIG. 5, the power supply relay 41 and the motor relay 42 are in an off-state and the assist control of the motor drive circuit 2 is in a stopped state. In this manner, the motor 7 is also in a stopped state.

In a state where automatic opening and closing operation of the back door 30 is not performed, for example, after locking of the back door 30 which is located at the fully closed position is released, the manipulator performs the opening manipulations on the back door 30 from the fully closed position (P1 in FIG. 5). Then, the movement detection unit 1b detects that the back door 30 is moved in the opening detection (Step S1 in FIG. 3: YES).

The manipulation assistance controller 1c turns the power supply relay 41 and the motor relay 42 on (Step S2 in FIG. 3) and starts the assist control of the motor drive circuit 2 (Step S3 in FIG. 3). In this case, as illustrated in FIG. 5, the manipulation assistance controller 1c first turns the power supply relay 41 on (P2 in FIG. 5), turns the motor relay 42 on (P3 in FIG. 5), and then executes the assist control of the motor drive circuit 2 (P4 in FIG. 5). With this, the current flows in the motor 7, the motor 7 rotates in the opening activation direction, and an assisting force is applied for the opening manipulation of the back door 30 (assist state). When the relays 41 and 42 are switched from the off-state to the on-state, activation noise is generated due to activation of an electromagnet.

Next, the controller 1 executes the stop condition confirmation process (Step S4 in FIG. 3). FIG. 4 is a flow chart illustrating details of the stop condition confirmation process. The stop condition confirmation process is executed during the assistance for the opening manipulation of the back door 30.

Figure 4:
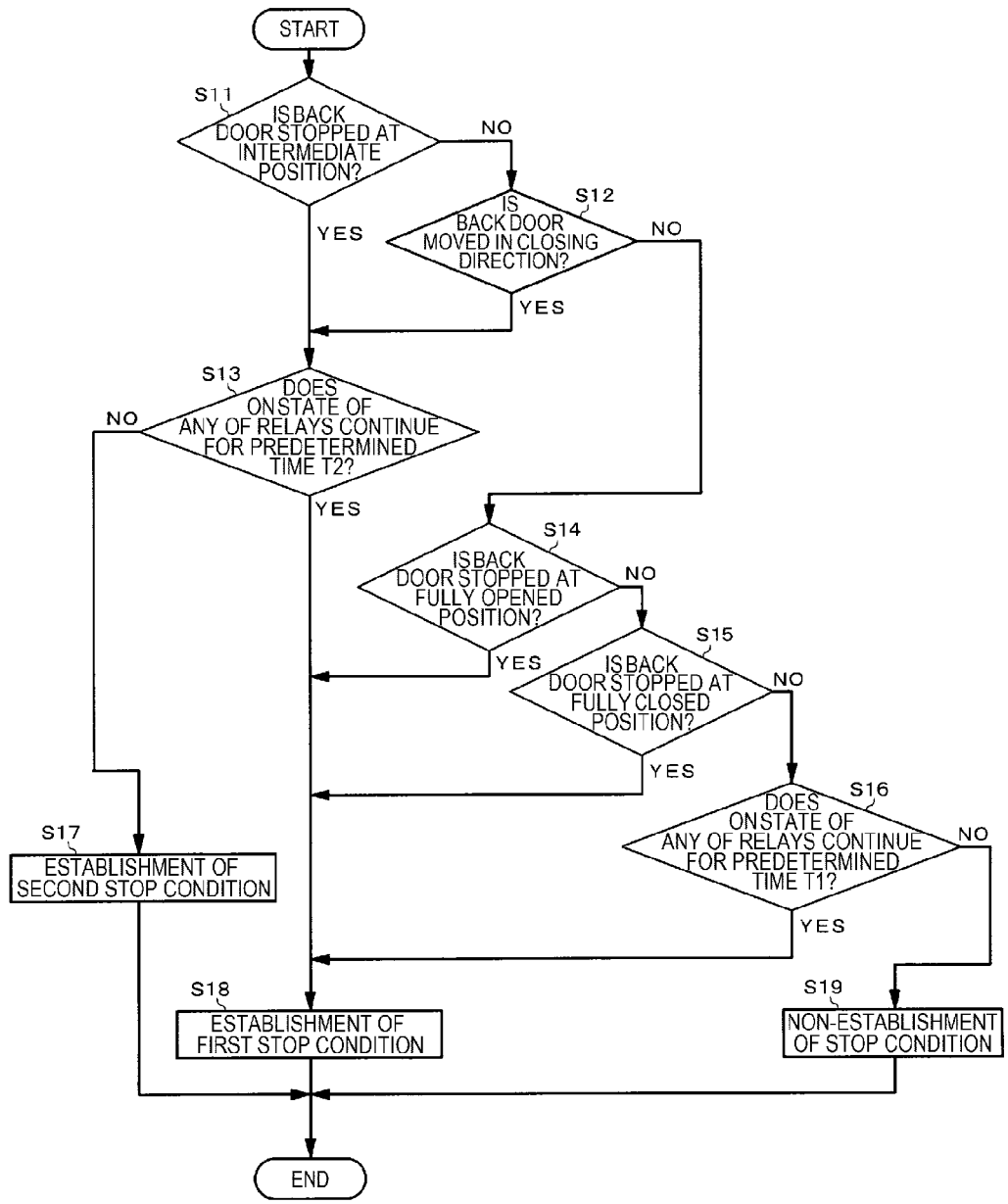
FIG. 4 is a flow chart illustrating details of a stop condition confirmation process of FIG. 3.

For example, it is assumed that the position detection unit 1a and the movement detection unit 1b detect that the back door 30 which was moving in the opening detection by the opening manipulation is stopped at an intermediate position (Step S11 in FIG. 4: YES, and P5 in FIG. 5) and the controller 1 confirms that the on-state of one or both of the relays 41 and 42 does not continue for a predetermined time T2 (for example, 10 seconds) (Step S13 in FIG. 4: NO). In this case, the controller 1 determines that a second stop condition is established (Step S17 in FIG. 4). The on-time of the relays 41 and 42 is measured by the controller 1 using a counter provided in an internal memory. The predetermined time T2 is an example of a "second predetermined time" according to one or more embodiments of the present invention.

Further, for example, it is assumed that the movement detection unit 1b detects that the back door 30, which was moving in the opening detection, is moved in the closing direction because the manipulator had stopped the opening manipulation of the back door 30 and performed the closing manipulation (Step S12 in FIG. 4: YES) and the controller 1 confirms that the on-state of one or both of the relays 41 and 42 does not continue for the predetermined time T2 (Step S13 in FIG. 4: NO). Also, in this case, the controller 1 determines that the second stop condition is established (Step S17 in FIG. 4).

As described above, when the second stop condition is established (Step S8 in FIG. 3: YES), the second stop controller 1e stops the assist control of the motor drive circuit 2 while maintaining the power supply relay 41 and the motor relay 42 in the on-state (Step S9 in FIG. 3, and P6 in FIG. 5). With this, the current does not flow in the motor 7, the motor 7 is stopped, and the assistance for the opening manipulation of the back door 30 is ended.

Thereafter, when the manipulator restarts the opening manipulation of the back door 30 (P7 in FIG. 5), the movement detection unit 1b detects that the back door 30 is moved in the opening detection (Step S1 in FIG. 3: YES). The manipulation assistance controller 1c restarts the assist control of the motor drive circuit 2 (Step S3 in FIG. 3 and P8 in FIG. 5) while turning the power supply relay 41 and the motor relay 42 on (Step S2 in FIG. 3). With this, the current flows in the motor 7, the motor 7 rotates in the opening activation direction, and the opening manipulation of the back door 30 is assisted again.

On the one hand, even when the back door 30, which was moving in the opening detection by the opening manipulation, is stopped at the intermediate position or is moved in the closing detection (Step S11: YES or Step S12: YES in FIG. 4) if the on-state of any of the relays 41 and 42 continues for the predetermined time T2 (Step S13 in FIG. 4: YES), the controller 1 determines that the first stop condition is established (Step S18 in FIG. 4).

Further, it is assumed that the position detection unit 1a and the movement detection unit 1b detect that the back door 30, which was moving in the opening detection by the opening manipulation, is stopped at the fully opened position (Step S14 in FIG. 4: YES, and P9 in FIG. 5). Also, in this case, the controller 1 determines that the first stop condition is established (Step S18 in FIG. 4).

It is assumed that the position detection unit 1a and the movement detection unit 1b detect that the back door 30, which was moving in the opening detection by the opening manipulation, is stopped at the fully closed position due to abruptly performed closing manipulation, for example (Step S15 in FIG. 4: YES). Otherwise, it is assumed that the on-state of any of the relays 41 and 42 continues for the predetermined time T1 (for example, 60 seconds) (Step S16 in FIG. 4: YES). Also, in such a case, the controller 1 determines that the first stop condition is established (Step S18 in FIG. 4). The predetermined time T1 is longer than or equal to the predetermined time T2 (T1>T2), and is an example of the "first predetermined time" according to one or more embodiments of the present invention.

As described above, when the first stop condition is established (Step S5 in FIG. 3: YES), the first stop controller 1d stops the assist control of the motor drive circuit 2 (Step S6 in FIG. 3) and turns the power supply relay 41 and the motor relay 42 off (Step S7 in FIG. 3). In this case, as illustrated in FIG. 5, the first stop controller 1d first stops the assist control of the motor drive circuit 2 (P10 in FIG. 5) and then turns the relays 41 and 42 off (P11 and P12 in FIG. 5). With this, the current is not caused to flow to the motor 7, the motor 7 is stopped, and the assistance for the opening manipulation of the back door 30 is ended. When the relays 41 and 42 are switched from the on-state to the off-state, the activation noise is generated due to activation of an electromagnet. In the meantime, the relays 41 and 42 may be turned off simultaneously and one of the relays 41 and 42 may be turned off first and the other may be turned off later.

On the other hand, in a case where any of the determination results in Steps S11, S12, S14, S15, and S16 is NO of FIG. 4, the controller 1 determines that the stop condition is not established (Step S19 in FIG. 4). In this case, since both of the first stop condition and the second stop condition are not established (Step S5: NO and Step S8: NO in FIG. 3), the controller 1 executes the stop condition confirmation process again (Step S4 in FIG. 3).

According to the embodiment described above, in a case where the back door 30 is subjected to the opening manipulation from the fully closed position, the relays 41 and 42 are turned on and the assist control of the motor drive circuit 2 is executed so that the assisting force is applied by the motor 7. Thereafter, for example, in a case where the back door 30 is stopped at the fully open position, the relays 41 and 42 are turned off, the assist control of the motor drive circuit 2 is stopped, and the assistance for the opening manipulation of the back door 30 is ended. However, in a case where the back door 30 is stopped at the intermediate position or the back door 30 is subjected to the closing manipulation, the assist control of the motor drive circuit 2 is stopped while turning the relays 41 and 42 on and the assistance for the opening manipulation of the back door 30 is ended. In a case where the back door 30 is subjected to the opening from the intermediate position again, the assist control of the motor drive circuit 2 is restarted while turning the relays 41 and 42 on. In this manner, it is possible to reduce the number of times of on and off manipulation of the relays 41 and 42 in the power back door control apparatus 10.

Since the on-state of the relays 41 and 42 continues until the opening manipulation of the back door 30 is restarted after the opening manipulation thereof is stopped, when the opening manipulation of the back door 30 is restarted, it is possible to immediately restart the assist control of the motor drive circuit 2 and to rapidly drive the motor 7. That is, there is no time delay between the restart of the opening manipulation and driving of the motor 7. In this manner, even if a counter electromotive power is generated in the motor 7 at the time of restarting the opening manipulation, it is hardly influenced by the generation of counter electromotive power. Therefore, a phenomenon that the manipulation load of the back door 30 first becomes heavier and then becomes lighter due to the counter electromotive power hardly occurs and a sense of incompatibility given to a manipulator becomes less.

Since the relays 41 and 42 are switched from the on-state to the off-state or from the off-state to the on-state until the opening manipulation of the back door 30 is restarted after the opening manipulation thereof is stopped, harsh sound is not generated from the relays 41 and 42 and a feeling of discomfort is not given to a person.

In the above-described embodiment, in a case where the back door 30 which was being subjected to the opening manipulation is stopped at the intermediate position or is subjected to the closing manipulation contrary to the opening manipulation, even when the on-state of the relays 41 and 42 continues, the assist control of the motor drive circuit 2 is stopped. In this manner, the current does not flow in the motor 7, the motor 7 is stopped, and the assisting force for the opening manipulation is not generated, thereby preventing erroneous operation of the motor 7 and the back door 30.

When the on-state of the relays 41 and 42 continues for a long time, power of the battery 11 is consumed. However, in the above-described embodiment, even in a case where any one of the on-states of the relays 41 and 42 continues for a time T1 or T2 longer than a normal opening and closing manipulation of the back door 30, the relays 41 and 42 are turned off and the assist control of the motor drive circuit 2 is stopped. In this manner, it is possible to prevent the power of the battery 11 from being consumed uselessly and suppress consumption of the battery 11.

The present invention can adopt various embodiments other than the above-described embodiment. For example, in the embodiment of FIG. 4, even when the back door 30 which was being subjected to the opening manipulation is stopped at the intermediate position or is moved to the closing direction (Step S11: YES and Step S12: YES in FIG. 4), in a case where the on-state of any of the relays 41 and 42 continues for the predetermined time T2 (Step S13: YES in FIG. 4), it is determined that the first stop condition is established (Step S18 in FIG. 4). However, the present invention is not limited only thereto.

Figure 6:
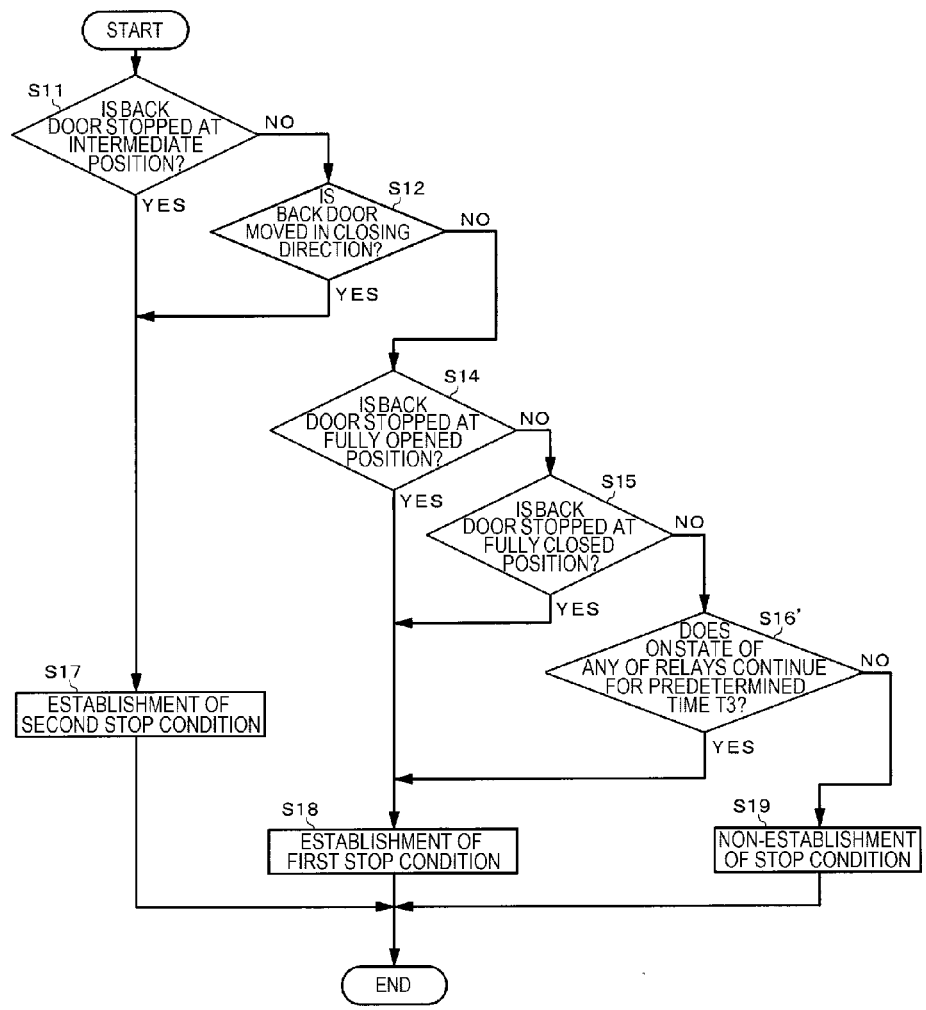
FIG. 6 is a flow chart illustrating details of a stop condition confirmation process according to another embodiment of the present invention.

In addition to that, for example, as another embodiment illustrated in FIG. 6, in a case where the back door 30 which was being subjected to the opening manipulation is stopped at the intermediate position or is moved to the closing direction (Step S11: YES and Step S12: YES in FIG. 6), the controller 1 may determine that the second stop condition is established without considering the continuation time of the on-state of the relays 41 and 42 (Step S17 in FIG. 6). The second stop controller 1e may stop the assist control of the motor drive circuit 2 while maintaining the relays 41 and 42 in the on-state of (Step S9 in FIG. 3). With this, the current does not flow in the motor 7, the motor 7 is stopped, and the assistance for the opening manipulation of the back door 30 is ended.

In the embodiment of FIG. 6, in a case where the back door 30 is stopped at the fully open position or the fully closed position (Step S14: YES and Step S15: YES in FIG. 6) and in a case where the on-state of any of the relays 41 and 42 continues for a predetermined time T3 (for example, 10 seconds) (Step S16' in FIG. 6: YES), the controller 1 determines that the first stop condition is established (Step S18 in FIG. 6). The predetermined time T3 is an example of a "first predetermined time" according to one or more embodiments of the present invention.

Figure 7:
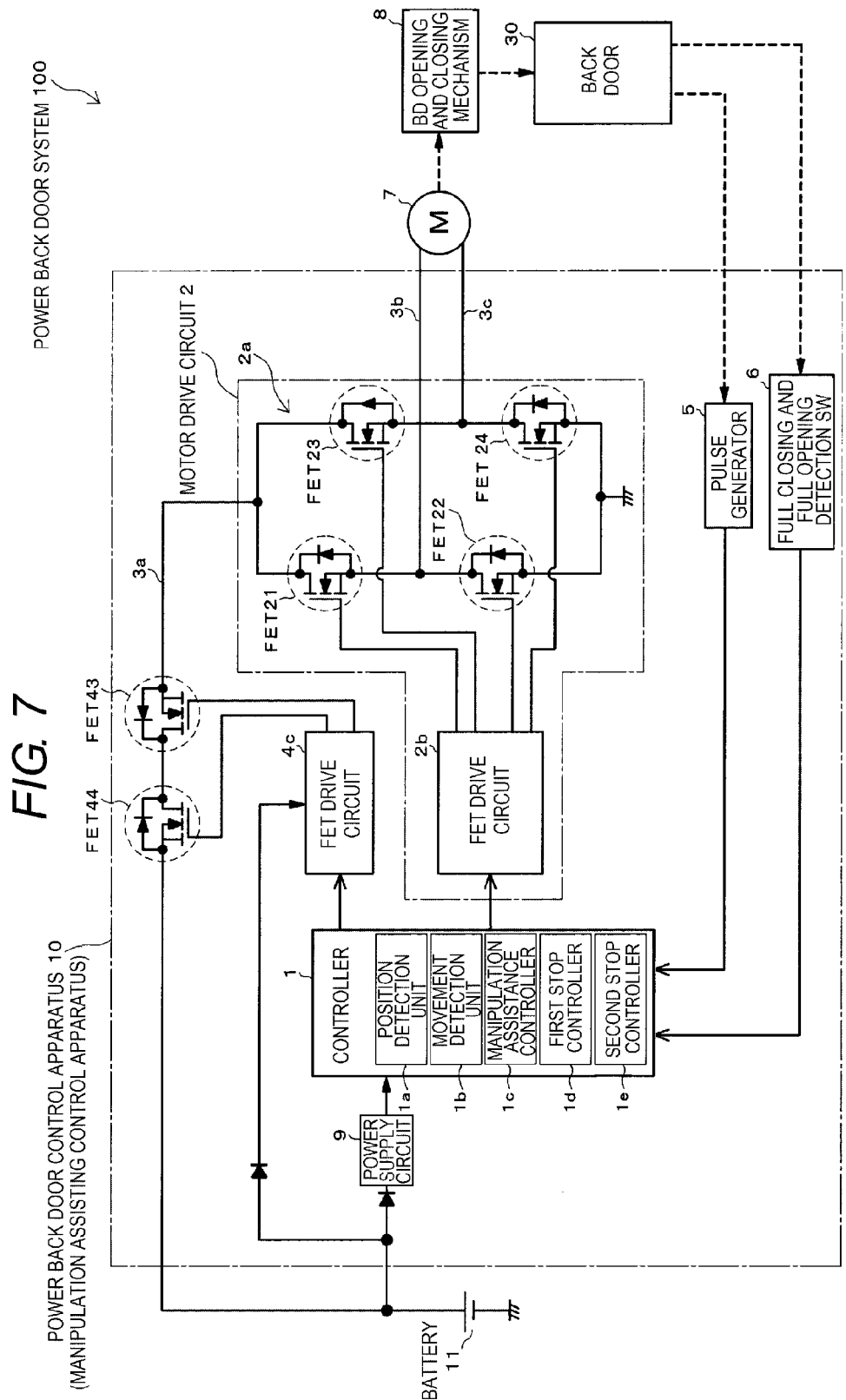
FIG. 7 is a block diagram illustrating a configuration of a power back door control apparatus according to another embodiment of the present invention.

In the embodiments as described above, although an example is illustrated in which the relays 41 and 42 as the switch means is provided in the current paths 3a and 3c through which the current is supplied from the battery 11 to the motor 7 through the motor drive circuit 2, the present invention is not limited only to the example. For example, a semiconductor switching element such as an FET, instead of a relay, may be provided in a current path through which the current is supplied from the battery 11 to the motor 7 through the motor drive circuit 2. FIG. 7 illustrates an embodiment for such a case.

In FIG. 7, the FET 43 for switching and the FET 44 for prevention of reverse connection are provided in the current path 3a from the battery 11 to the motor drive circuit 2. The switch means is not provided in the current paths 3b and 3c from the motor drive circuit 2 to the motor 7. The FET drive circuit 4c turns each of the FET 43 and FET 44 on and off. Each of the FET 43 and FET 44 is turned on by the FET drive circuit 4c and thus, the current path 3a enters a conductible state and the current is supplied from the battery 11 to the motor drive circuit 2. The FET 43 and FET 44 are turned off by the FET drive circuit 4c and thus, the current path 3a enters an interrupted state and the current is not supplied from the battery 11 to the motor drive circuit 2. In a case where a positive electrode and a negative electrode of the battery 11 are reversely connected (reverse connection), the FET 44 has a function of protecting the FET 43 or the FETs 21 to 24 of the motor drive circuit 2. The FET 43 is an example of the "semiconductor switching element" and the "switch means" according to one or more embodiments of the present invention.

As described above, the FET 43 is used as the switch means and thus, the FET 43 is turned on or off such that harsh sound is not generated and does not give a feeling of discomfort to the manipulator. The on-state of the FET 43 continues until the opening manipulation of the back door 30 is restarted after the opening manipulation is stopped and thus, it is possible to immediately restart the assist control of the motor drive circuit 2 and to rapidly drive the motor 7 at the time of restarting the opening manipulation of the back door 30. That is, there is no time delay between the restart of the opening manipulation and driving of the motor 7. In this manner, even if a counter electromotive power is generated in the motor 7 at the time of restarting the opening manipulation, it is hardly influenced by the generation of counter electromotive power. Therefore, a phenomenon that the manipulation load of the back door 30 first becomes heavier and then becomes lighter due to the counter electromotive power hardly occurs and a sense of incompatibility given to a manipulator becomes less.

In another embodiment, the switch means such as the FET may also be provided in the current paths 3b and 3c from the motor drive circuit 2 to the motor 7. The semiconductor switching element other than the FET may also be used as the switch means. Furthermore, a mechanical switch means such as a relay may be used together with the semiconductor switching element.

In the embodiments described above, although an example is described in which the opening manipulation of the back door 30 is assisted by the power of the motor 7 and the closing manipulation of the back door 30 is not assisted, the present invention is not limited only thereto. In addition to that, for example, both of the opening direction and the closing direction are set as the movement direction of the back door 30 to be assisted. In a case where the back door 30 is subjected to the opening manipulation to be moved to the opening direction, the motor 7 may be driven by the motor drive circuit 2 so as to assist the opening manipulation, and in a case where the back door 30 is subjected to the closing manipulation to be moved to the closing direction, the motor 7 may be driven by the motor drive circuit 2 so as to assist the closing manipulation. Otherwise, only in the case where the back door 30 is subjected to the closing manipulation to be moved to the closing direction, the motor 7 may be driven by the motor drive circuit 2 so as to assist the closing manipulation.

In the embodiments described above, although the swing-up type back door 30 is exemplified, the present invention is not limited only thereto, and another type of back door may be used.

Furthermore, in the embodiments described above, an example in which the present invention is applied to the power back door control apparatus 10 of the automatic four wheel vehicle is described, but the present invention is not limited thereto. For example, the present invention can also be applied to a manipulation assistance control apparatus such as a power slide door control apparatus which opens and closes a slide door.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A manipulation assisting control apparatus, comprising:
   a motor drive circuit which drives a motor;
   a switch unit provided in a current path through which electric current is supplied from a power supply to the motor through the motor drive circuit;
   a position detection unit which detects a position of a manipulation target object;
   a movement detection unit which detects a movement of the manipulation target object; and
   a manipulation assistance controller which controls the motor drive circuit such that an assisting force is applied by the motor for manipulation of the manipulation target object;
   wherein the manipulation assistance controller causes the switch unit to be in an on-state and which executes control of the motor drive circuit such that the assisting force is applied by the motor, in a case where the manipulation target object is moved in a predetermined direction, and
   wherein the manipulation assisting control apparatus further comprises:
   a first stop controller which causes the switch unit to be in an off-state and which stops the control of the motor drive circuit, in a case where the manipulation target object which is moved in the predetermined direction stops at an end position; and
   a second stop controller which causes the switch unit to be in the on-state and which stops the control of the motor drive circuit, in a case where the manipulation target object which is moved in the predetermined direction stops at an intermediate position or in a case where the manipulation target object moves in a direction opposite to the predetermined direction.

2. The manipulation assisting control apparatus according to claim 1,
   wherein when the manipulation assistance controller executes the control of the motor drive circuit, the current flows in the motor and the assisting force is generated by the motor, and
   wherein when the first stop controller or the second stop controller stops the control of the motor drive circuit, the current does not flow in the motor and the motor is stopped.

3. The manipulation assisting control apparatus according to claim 1,
   wherein the switch unit comprises:
   a first switch unit provided in a first current path from the power supply to the motor drive circuit; and
   a second switch unit provided in a second current path from the motor drive circuit to the motor.

4. The manipulation assisting control apparatus according to claim 1,
   wherein the first stop controller causes the switch unit to be in the off-state and stops the control of the motor drive circuit even in a case where the on-state of the switch unit continues for a first predetermined time.

5. The manipulation assisting control apparatus according to claim 1,
   wherein even in a case where the manipulation target object which is moved in the predetermined direction stops at the intermediate position or in a case where the manipulation target object is moved in a direction opposite to the predetermined direction, when the on-state of the switch unit continues for a second predetermined time, the first stop controller causes the switch unit to be in the off-state and stops the control of the motor drive circuit.

6. The manipulation assisting control apparatus according to claim 1,
   wherein a relay is used as the switch unit.

7. The manipulation assisting control apparatus according to claim 1,
   wherein a semiconductor switching element is used as the switch unit.

8. The manipulation assisting control apparatus according to claim 1,
   wherein the manipulation target object is a back door of a vehicle, and
   wherein the manipulation assisting control apparatus is a power back door control apparatus which applies the assisting force by the motor for an opening and closing manipulation of the back door by manual manipulation.

* * * * *